(12) United States Patent
Passy

(10) Patent No.: US 11,810,179 B2
(45) Date of Patent: Nov. 7, 2023

(54) METHOD FOR TRACKING PRODUCTS USING DISTRIBUTED, SHARED REGISTRATION BASES AND RANDOM NUMBERS GENERATED BY QUANTUM PROCESSES

(71) Applicant: Rogerio Passy, Rio de Janeiro (BR)

(72) Inventor: Rogerio Passy, Rio de Janeiro (BR)

( * ) Notice: Subject to any disclaimer, the term of this patent is extended or adjusted under 35 U.S.C. 154(b) by 0 days.

(21) Appl. No.: 17/047,322

(22) PCT Filed: Apr. 10, 2018

(86) PCT No.: PCT/BR2018/050097
§ 371 (c)(1),
(2) Date: Oct. 13, 2020

(87) PCT Pub. No.: WO2019/195903
PCT Pub. Date: Oct. 17, 2019

(65) Prior Publication Data
US 2021/0272184 A1    Sep. 2, 2021

(51) Int. Cl.
*G06Q 30/00* (2023.01)
*G06Q 30/0601* (2023.01)

(52) U.S. Cl.
CPC ..... *G06Q 30/0635* (2013.01); *G06Q 30/0639* (2013.01); *G06Q 2220/00* (2013.01)

(58) Field of Classification Search
CPC .......... G06Q 30/0635; G06Q 30/0639; G06Q 2220/00

(Continued)

(56) References Cited

U.S. PATENT DOCUMENTS 3,833,795 A    9/1974  Shoshani et al.
6,442,276 B1   8/2002  Doljack
(Continued)

OTHER PUBLICATIONS

Gogo, A. (2010). Design and end-to-end test of a cloud-based mobile product authentication architecture for low resource environments (Order No. 3494294). Available from ProQuest Dissertations & Theses Global. (921470104). (Year: 2010).*

(Continued)

*Primary Examiner* — Arielle E Weiner
(74) *Attorney, Agent, or Firm* — LUCAS & MERCANTI, LLP

(57) ABSTRACT

A method for tracking products, involving a subprocess (100) for generating and associating codes with products, and a subprocess (200) for acquiring products is provided, which enable the consumer, by using his/her smartphone, directly to identify forged, adulterated or stolen products or those containing any information supplied by the manufacturer that prohibits the sale thereof, transforming the consumer into an active element in an integrated control system. The consumer becomes a terminal in a network, fully equipped with online communication and information tools, in addition to cameras and other sensors, making the consumer a potential agent for authenticating products and goods in general. Furthermore, a method (300) for validating encounters, capable of authenticating and validating an encounter between two or more mobile devices or between a mobile device and a fixed device is provided, the method (300) authenticating an encounter between two persons by use of their smartphones.

21 Claims, 14 Drawing Sheets

(58) Field of Classification Search
USPC .................................................. 705/26.81
See application file for complete search history.

(56) References Cited

U.S. PATENT DOCUMENTS

| | | | |
|---|---|---|---|
| 7,917,443 B2 | 3/2011 | Dillon | |
| 8,566,598 B2 | 10/2013 | Goodman | |
| 9,473,303 B2 | 10/2016 | Hedtke et al. | |
| 2005/0234823 A1 | 10/2005 | Schimpf | |
| 2006/0165260 A1 | 7/2006 | Vanjani et al. | |
| 2013/0024387 A1* | 1/2013 | Dillon | G06Q 10/0833 705/317 |
| 2014/0379597 A1* | 12/2014 | Chung | G07C 9/00571 705/318 |
| 2015/0278805 A1 | 10/2015 | Spencer, III et al. | |
| 2016/0171439 A1* | 6/2016 | Ladden | G06Q 10/0832 705/340 |
| 2016/0189169 A1 | 6/2016 | Shah et al. | |
| 2016/0217436 A1* | 7/2016 | Brama | G06Q 20/10 |
| 2016/0321677 A1* | 11/2016 | Dobaj | G06Q 30/0185 |
| 2017/0032382 A1* | 2/2017 | Shulman | G06Q 30/0185 |
| 2017/0046709 A1 | 2/2017 | Lee et al. | |
| 2017/0046806 A1 | 2/2017 | Haldenby et al. | |
| 2017/0048216 A1 | 2/2017 | Chow et al. | |
| 2017/0053293 A1* | 2/2017 | Choi | G06Q 30/0185 |
| 2017/0206574 A1* | 7/2017 | Sharma | G06Q 30/0643 |
| 2018/0096175 A1* | 4/2018 | Schmeling | G06Q 10/08 |
| 2018/0108024 A1* | 4/2018 | Greco | H04L 9/0637 |
| 2018/0173896 A1* | 6/2018 | Arneson | G06F 21/6263 |

OTHER PUBLICATIONS

Continued ref U: Retrieved from https://www.proquest.com/dissertations-theses/design-end-test-cloud-based-mobile-product/docview/921470104/se-2 (Year: 2010).*

Guy Harrison, "Sealing MongoDB Data on the Blockchain", [online], [URL: https://dzone.com/articles/sealing-mongodb-data-on-the-blockchain], pp. 1-6, 2018.

Swiss Quantum, "What is the Qin QRNG?", Random number generation white paper, V. 1.2, [online], [URL: https://technodocbox.com/Computer_Peripherals/78526593-What-is-the-q-in-qmg.htmll, pp. 1-13, 2017.

International Search Report and Written Opinion dated Feb. 6, 2019 for PCT/BR2018/050097 and English translation.

International Preliminary Report on Patentability dated Jul. 30, 2020 for PCT/BR2018/050097 and English translation.

* cited by examiner

METHOD FOR TRACKING PRODUCTS USING DISTRIBUTED, SHARED REGISTRATION BASES AND RANDOM NUMBERS GENERATED BY QUANTUM PROCESSES

CROSS REFERENCE TO RELATED APPLICATION

This Application is a 371 of PCT/BR2018/050097 filed on Apr. 10, 2018 which is incorporated herein by reference.

FIELD OF THE INVENTION

The present invention refers to a method for tracking and checking the authenticity and origin of products, goods and documents, which simultaneously satisfices the principles of inviolability, robustness and traceability.

DESCRIPTION OF STATE OF THE ART

One of the greatest challenges facing product manufacturers today is the fight against counterfeiting, which has been progressively increasing with increasingly easy access to processes and inputs available in the globalized market. Consequently, the quality of counterfeits has increased to such an extent that it is almost impossible for a layperson to differentiate between a true product and a fake one.

Today's consumer has no tool that can identify the authenticity and origin of a product, and, therefore, in some cases the consumption of counterfeit products reaches 30% of the total. Losses to businesses, consumers and the government itself are therefore reaching extremely high levels.

In addition to financial losses, there are risks to consumers' health from the use of counterfeit products such as medicines, beverages, food and cigarettes. In the case of drugs, statistics show that in some countries, such as Brazil, some drugs have 20% counterfeit rates, and worldwide, the World Health Organization estimates that 10% of all drugs are fake, which can be considered as a risk to the health of the population as a whole.

Alcoholic beverages can be considered the champions of counterfeiting worldwide, where counterfeit products have highly health-harmful elements such as methanol or high levels of dyes. Reports have already identified real cigarette counterfeiting industries, moving a market in the hundreds of millions of dollars.

Currently, in some products, there is the use of archaic forms that claim to guarantee their authenticity. For example, we can mention the paper stamps used in cigarette and beverage packaging, which can be easily copied and replicated, without any tools available to the end consumer to verify their authenticity.

Some manufacturers, on the other hand, rely solely on their serial and batch numbers, which can also be trivially replicated. Recent attempts to create a layer of counterfeit protection include holographic labels, certificates using paper money, among others. Such devices, although they may hinder the action of malicious individuals, do not represent an insurmountable barrier to counterfeiting products.

In parallel, authentic products are smuggled and stolen, representing a millionaire market and a millionaire loss to manufacturers and consumers the same way. The consumer, in turn, also has no tool to alert him of the consumption of a stolen product.

A major problem in identifying cargo theft gangs is determining the location of dealers of these stolen products quickly, with the purpose of recovering and curbing this type of crime. In some cases, due to the scale of theft, it becomes almost impossible for law enforcement to identify each stolen product. This is the case, for example, with stolen electronics, which are sold both on the street and on online sales platforms without any supervision. On the other hand, the manufacturer has done little to use new technologies that allow the authentication of its products.

Thus, the best solutions found by manufacturers to curb counterfeiting involve random numbers. This is the case, for example, in the software industry, which associates alphanumeric activation keys with each commercial use license. However, at present, all codes used by the industry for product identification, including not only software activation keys but also product serial numbers, are generated in a deterministic or pseudorandom manner and are therefore potentially vulnerable to attack to and breach of their algorithms by malicious third parties.

Therefore, it is critical that such unique identification codes for each product are generated in such a way that they are completely tamper evident. In turn, it is also critical that all transactions involving codes are inviolably stored and tracked, thus ensuring that a determined good is tracked uniquely from manufacture to final consumption.

Thus, in order to try to mitigate the above-disclosed issue, many solutions were sought in an attempt to solve the above-identified problems, as can be seen in the documents below.

U.S. Pat. No. 6,442,276 B1 describes a method for verifying the authenticity of goods, which includes generating one or more random codes and storing those codes in a database. However, said patent has problems that may impair accurate code verification: (i) said patent uses computer generated numbers, i.e. pseudorandom numbers, so that its randomness cannot be audited or even verified; (ii) there is no end user participation in the authentication process; (iii) the system is not online, that is, a database update at one location cannot be immediately observed from another location; (iv) the system does not use the internet; (v) the authentication method relies solely on pseudorandom numbers and asymmetric encryption, not using additional sensors or location methods; (vi) the database is not guaranteed to be robust and may be tampered with by an unauthorized third party and thus compromising the entire integrity of the system; (vii) the system is unable to identify an event where an authentic code is used on a product or quite different from the original (such as a code originally produced for a cell phone to be used in a refrigerator); (viii) the system does not mention issuer validation and authentication and document content.

U.S. Pat. No. 9,473,303 B2, in turn, describes a system that during the manufacture of a product creates an authentication code based on device-specific information related to the product. However, said patent has the following problems: (i) it uses an asymmetric encryption system, in which any private key leakage compromises the integrity of the system; (ii) the system is not bidirectional, that is, there is no information sent by the end user to the manufacturer; (iii) the system does not use any sensor or smartphone location method, so there is no guarantee that a good will be delivered to a particular geographic location; (iv) the system does not provide any protection against theft, i.e. the consumer has no means of verifying that he is purchasing a stolen product; (v) the system does not mention issuer validation and authentication and document content; (vi) the system has no guarantee of robustness, so any attack on the database by a third party will compromise the integrity of the system.

Additionally, US 2005/0234823 A1 describes a system for marking products for authentication, preventing surplus production and allowing product tracking. Said document (i) uses a symmetric or asymmetric encryption system, in which any single/private key leakage compromises the integrity of the system; (ii) the system is not bidirectional, that is, there is no information sent by the end user to the manufacturer; (iii) the system does not use any sensor or smartphone location method, so there is no guarantee that a good will be delivered to a particular geographic location; (iv) the system does not provide for the creation of an account where the end user has access to their product certificates and their history; (v) the system does not mention issuer validation and authentication and document content; (vi) the system has no guarantee of robustness, so any attack on the database by a third party will compromise the integrity of the system.

U.S. Pat. No. 8,566,598 B2, on the other hand, describes a method for producing an authenticable product, whereby a person or party other than the manufacturer of the product can determine that the product marked with a specific code is an authentic product. However, said patent (i) involves an authority (third party) responsible for authentications, which needs to be entrusted by the consumer; (ii) the system involves deterministic codes similar to serial numbers and can therefore be easily copied; (iii) the system does not mention issuer validation and authentication and document content; (iv) the system has no guarantee of robustness, so any attack on the database by a third party will compromise the integrity of the system.

In addition, one may also mention U.S. Pat. No. 7,917,443 B2, which describes a system and method that allows a manufacturer to mark products with encoded data that allows products to be readily identified and tracked while being distributed in the trade chain. However, in said patent (i) a random number generation mechanism is not contemplated; (ii) the system does not use any sensor or smartphone location method, so there is no guarantee that a good will be delivered to a particular geographic location; (iii) there is no information sent by the end user to the manufacturer/system; (iv) the system does not mention the use as a certificate of ownership; (v) the system does not mention the protection against cargo theft occurring within the same distribution channel; (vi) the system does not mention issuer validation and authentication and document content; (vii) the system has no guarantee of robustness, so any attack on the database by a third party will compromise the integrity of the system.

Another document that can be mentioned is US 2016/0189169 A1, which describes a system that allows a mobile application to communicate with a product database server to determine if the server has the product identifier, and a method that includes obtaining a product identifier, encrypting data associated with the obtained product identifier, and sending data to a database to determine if the database has the obtained product identifier.

However, (i) a random number generation mechanism is not contemplated in the description of said document; (ii) the system does not mention protection against stolen products; (iii) the system may not be used as a certificate of ownership; (iv) the system has no guarantee of robustness, so any attack on the database by a third party will compromise the integrity of the system.

In addition, US Patent Application 2016/0217436 A1 can describe a method, system and computer program product for tracking and protecting transactions of items authenticated in blockchain systems. However, (i) the security mechanism described in said document is based on asymmetric key encryption, which is already intrinsic to the blockchain; (ii) the system features only a good traceability mechanism based on blockchain properties, which has performance limitations when applied to large scale products such as medicines and food; (iii) all commercial transactions of the goods are made using the blockchain digital currency.

US 2006/0165260 A1 describes a method, system and apparatus for verifying the authenticity of a product. However, the invention described in said document is based on providing a card to the consumer and relies on a telephone call center to validate a unique identification number that is provided by the manufacturer.

Finally, US 2017/0046709 A1, US 2017/0046806 A1 and US 2017/0048216 A1 which describe a product and/or document tracking system may also be mentioned. However, in these documents (i) the security mechanism is based on asymmetric key encryption intrinsic to the blockchain; and (ii) all commercial transactions of the goods are made using the blockchain digital currency.

SUMMARY OF THE INVENTION

Thus, as can be seen from the description of the state of the art, there are currently no integrated systems that allow the end consumer to quickly and reliably identify whether a particular product is authentic and/or is being legitimately marketed. For example, when purchasing a ticket for an event (show, movie, sporting event, etc.), the consumer must necessarily trust the person or company making the sale.

In addition, there is a growing gap between the manufacturer and the end consumer, while there is an increasing interest on the part of the manufacturer to know the consumers, just as consumers want to know more about the products they consume. Companies rely on indirect data and Big Data algorithms to identify consumer patterns, regions and even the identity of the end consumer. There is no direct link that provides this type of information clearly to the manufacturer.

There are several markets where it is essential to establish a traceability chain between manufacturers and end consumers, going through all intermediate stages of distribution/resale/etc. Especially in the drug market this problem is fundamental to ensure the availability of medicines and hospital supplies. In some countries, such as Brazil, laws already exist that oblige manufacturers and importers to inform regulatory agencies of all movement of their products along the distribution chain.

Thus, the main purpose of the present invention is to enable consumers via their smartphones to directly identify fake, tampered, stolen products or products that contain any information provided by the manufacturer that prevents their sale (such as manufacturing defects, contamination, expiration date, etc.), making it an active element of an integrated control system.

This way, the consumer becomes a network terminal fully equipped with online communication and information tools, as well as cameras and other types of sensors, making it a potential authentication agent for products and goods in general.

Furthermore, a second object of the invention is to enable certification of ownership of a product, good or document, that is, to provide assurances that a certain good belongs to a certain individual, as well as to keep a record of all goods acquired by an individual and a history of all individuals who have already owned a particular good, thus generating a traceability chain of the product or good.

In addition, the present invention also enables the authenticity of products and goods for the purpose of content control and document authenticity, such as prescriptions, contracts, certificates, deeds, paper money, etc. Currently, notaries and central banks solve part of this problem in an archaic and inefficient manner. In the specific case of prescriptions, the document may be validated and already used by a third party, such as a drugstore or hospital, as it can only be used once.

Using all its functions, a method is proposed which is also capable of authenticating and validating an encounter between two or more mobile devices or between a mobile device and a fixed device. For example, the method can authenticate the encounter between two people through their smartphones. In this case, dynamic codes are generated for one or both devices and the validation will be performed taking into account the time of reading of each code, as well as cross information from other geolocation sensors.

The only known way of random number generation is performed through physical phenomena explained by the theory of quantum mechanics. The present invention uses these phenomena in order to obtain guaranteed random numbers, where the guarantee is given by the laws of physics themselves. By combining this method of random number generation with blockchain virtual currency technology, it can also be possible to ensure that the generated numbers are inviolable and traceable.

In short, the present invention aims to provide a tracking method that provides: (i) guarantees of randomness; (ii) auditability of the random code (number) generation process; (iii) submission of unlocking passwords for new products; (iv) creation of dynamic codes sent to a particular smartphone to prove the location and/or encounter between two individuals or between an individual and a device; (v) sending manufacturer information to the end consumer, such as recall notices, maintenance, upgrades, or any other relevant information.

BRIEF DESCRIPTION OF THE INVENTION

The present invention aims to transform the end user into an authentication terminal via a preferably mobile device such as a smartphone or tablet. A code, printed on the product by the manufacturer, is read by the device's camera and transmitted to a server, which is responsible for authenticating the code.

The codes are generated in a proven random way, through quantum phenomena in a central, and acquired by the manufacturer, who will in turn associate each code in a unique way to a product.

Thus, as products are being distributed or purchased by consumers, the corresponding codes are blocked so that no code can be reused. Each process step is recorded in a centralized database which periodically generates a hash that in turn feeds a blockchain.

The practical impossibility of tampering with data in the blockchain translates into the impossibility of circumventing the centralized database. Thus, the method simultaneously acquires the following properties: uniqueness, randomness, irreversibility, inviolability, non-reproducibility, auditability, perennity, traceability and reliability. Each of these properties can be set as follows.

Uniqueness: The generated code consists of two parts: a sequentially generated first part and a randomly generated second part. Accordingly, each number will be unique per construction.

Randomness: The second part of each code is guaranteed and proven to be randomly generated through a quantum process. Randomness is guaranteed by the laws of physics. Due to the development of conventional and quantum computation, encryption methods and random code/number generation that do not depart from seeds or classical algorithms become necessary, as these can be broken, mainly by quantum algorithms.

Irreversibility: It is not conceivable in any way conceivable to obtain the second part of the code from the first part, and vice versa.

Inviolability (robustness): The database that has the code information is tamper proof against tampering attempts, which is guaranteed by the blockchain system.

Non-reproducibility: Any attempt to copy a code is overridden by the system as the codes used are blocked at the time of consumption/purchase. Therefore, any attempt at mass infringement becomes unfeasible.

Auditability: At any time, the code generation process can be audited by the client who will use them in their products. This client is given a guarantee of randomness of numbers, that is, a guarantee that those numbers were actually generated randomly and not obtained by other means or numerical algorithms.

Perennity: Information on codes in circulation, including those already in use, will be kept on a permanent basis, i.e. no loss of information on codes already produced. This feature is guaranteed by the use of blockchain system for data storage.

Traceability: The system stores information that is updated at each of the intermediate instances of the distribution chain: manufacturer/importer, distributor, point of sale, end consumer, and all carriers involved in any of these segments. All this movement is associated with the individual code of each product and/or the product batch to which it belongs. From this data, the consumer can query the origin of their product and confirm if the product was obtained at the originally designated place. This prevents a product from having its code replicated even once and from being marketed in another establishment outside the original registered chair. Traceability may also serve as a certificate of authenticity of a product, including for resale purposes.

Reliability: All of the above features guarantee the reliability of the system as a whole.

The presented solution can also be applied to documents, in order to guarantee the authenticity of its sender, receiver and content.

Finally, the present invention provides for a code to be dynamically generated, so that its reading associated with a timestamp acts as a guarantee of the presence of a device in a certain location.

BRIEF DESCRIPTION OF DRAWINGS

The present invention is hereinafter described in more detail based on an exemplary embodiment represented by the figures, the brief descriptions of which are as follows.

DESCRIPTION OF THE INVENTION

Figure 1:
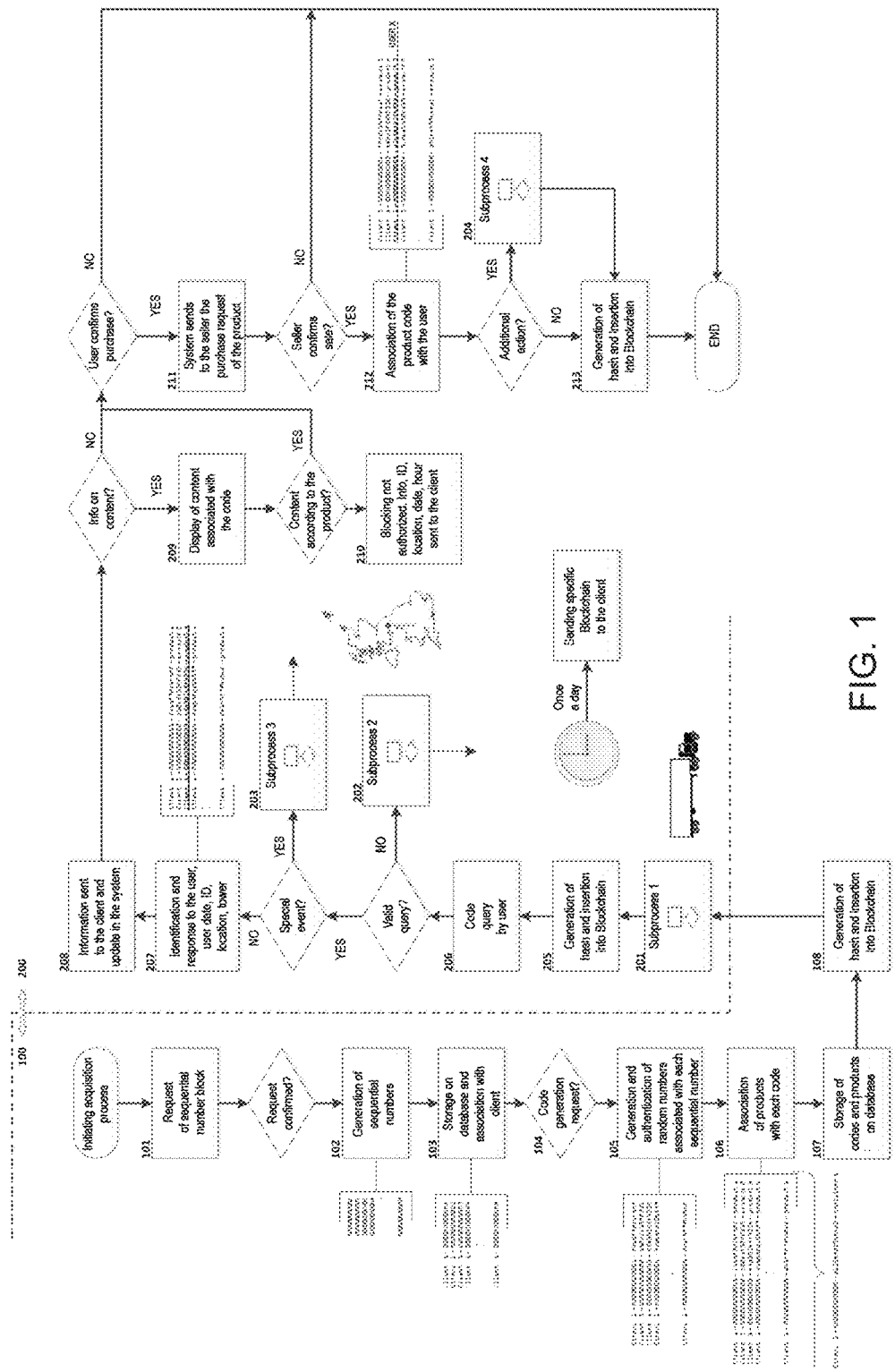
FIG. 1—a general flow chart of the process of generating and associating codes to products, of the process of query and the product acquisition process that form the product tracking method proposed by the present invention.
Figure 10:
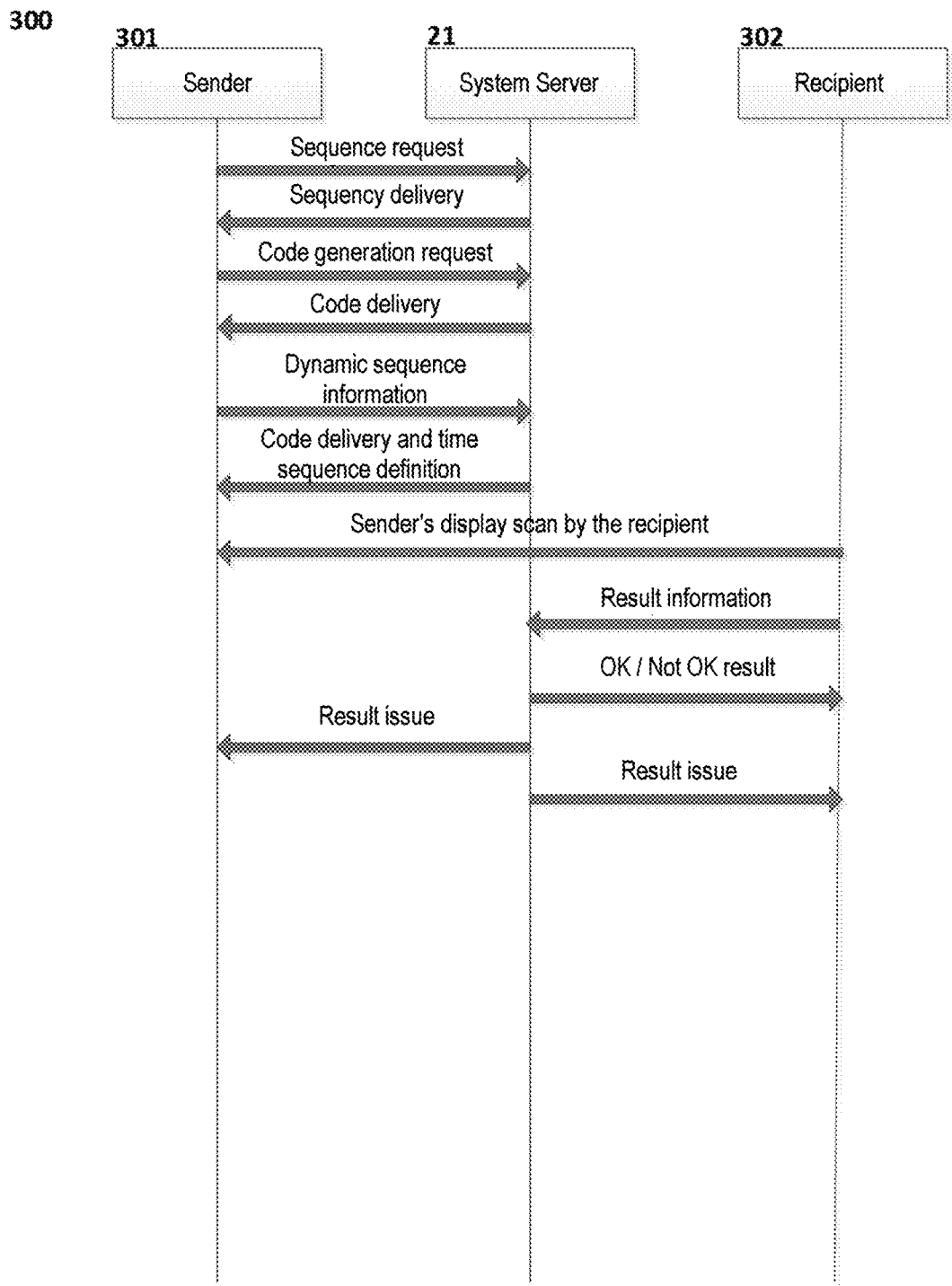
FIG. 10—a flow diagram of the encounter validation process.

An embodiment of the present invention is comprised of a product tracking macroprocess, comprising a product code generation and association process 100 and a product acquisition process 200, both shown in FIG. 1. In addition, an encounter validation process 300 is provided, as shown in FIG. 10.

Figure 2:
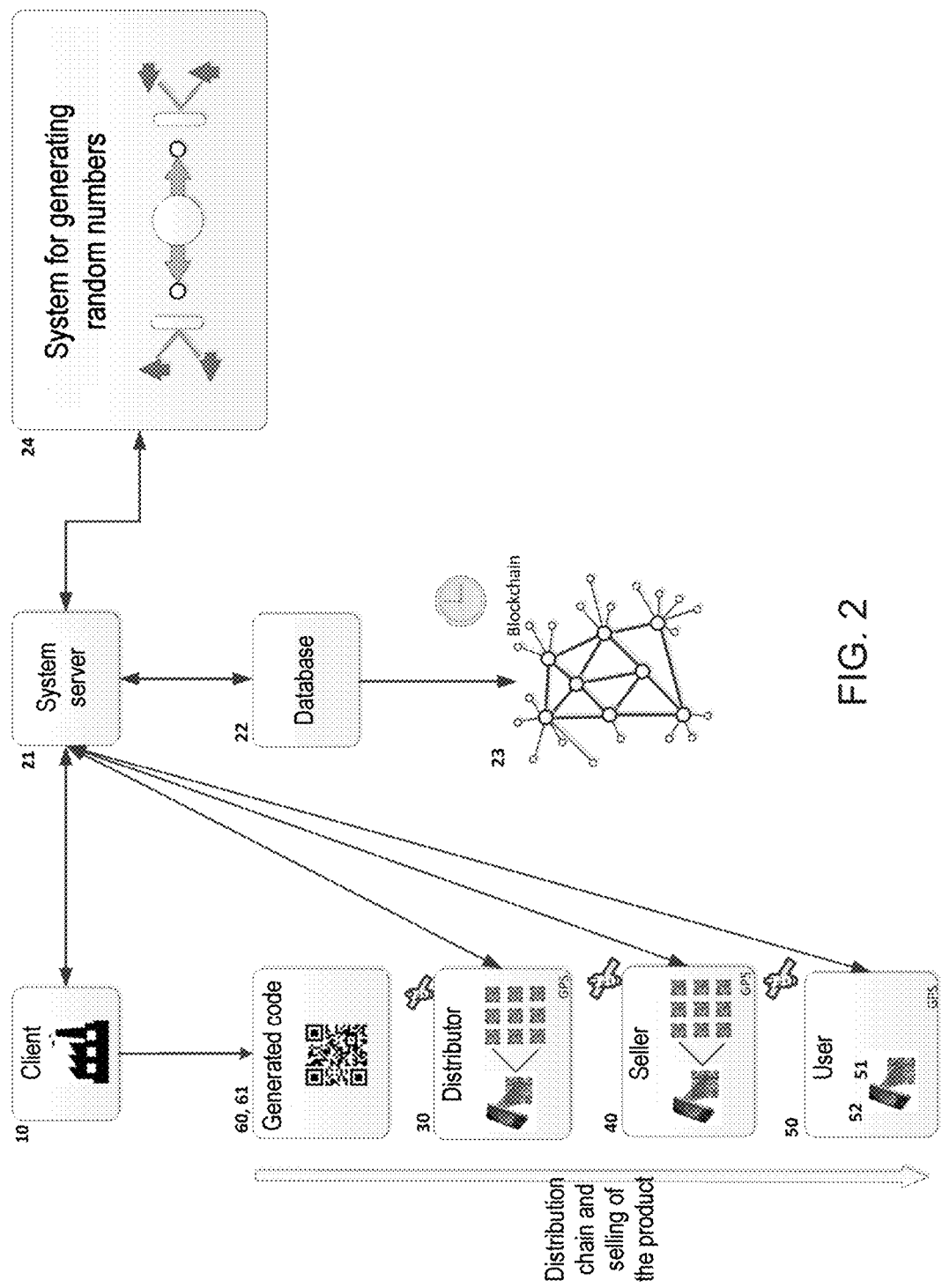
FIG. 2—a block diagram of the components involved in the present invention.

FIG. 2 illustrates the components involved in the tracking method provided by the present invention. Such components, or system agents, are: client 10, system server 21, centralized database 22, blockchain 23, random number generation system 24, distributor 30, point of sale (seller)) 40, user 50 (provided with validation equipment 51 with a validation software 52), and physical code 60 (or container code 61).

Before beginning the description of the present invention itself, and in order to facilitate its understanding, some terms and expressions used throughout the text are defined below.

"Client" 10 is defined as the individual or legal entity responsible for the manufacture, development or importation of the products to be verified, authenticated and/or tracked.

"System server" 21 is defined as a computer or computer network responsible for exchanging information between client 10, centralized database 22, random number generation system 24, distributor 30, seller 40 and user 50.

"Centralized database" 22 is defined as an indexed data structure responsible for information storage and report generation involving this information.

"Blockchain" 23 is defined as a data structure based on "blockchain" technology.

"Random number generation system" 24 is defined as a physical apparatus responsible for the generation and validation of random numbers based on a fundamental physical principle.

"Distributor" 30 is defined as one or more intermediary agents between client 10 and seller 40.

"Seller" 40 is defined as an individual or legal entity responsible for selling products that contain the codes generated by the system.

"User" 50 is defined as an individual equipped with validation equipment 51. Each user 50 is assigned a unique identification number which is used to distinguish one user from another. This unique identification number can be obtained in a variety of ways, such as private keys, username and password, mobile phone number, or any other existing user authentication system.

"Validation equipment" 51 is defined as a smartphone, tablet or any other type of device or equipment capable of connecting to the Internet, capable of reading bar code, QR code or DATAMATRIX code, or any other uni- or two-dimensional codes, capable of sending its geolocation via GPS or any other geolocation technology, which has a display or any other means of interaction with user 50, distributor 30 or seller 40 and which has the validation app 52 installed.

From now on, whenever the text refers to "geolocation data", it is assumed that they are obtained from information available on the validation equipment 51 used by distributor 30, seller 40 or user 50 in their respective process step. This information obtained from validation equipment 51 may use GPS data, triangulation of cellular antennas or any other methods that indicate geographic location with the highest level of accuracy available. Alternatively, or together, the encounter validation process 300 may be used to obtain geographic location data.

"Validation application" 52 is defined as a software developed for device platforms with features of the validation equipment 51 capable of communicating with system server 21 in order to send and receive user-specific data 50 related to each physical code 60.

"Physical code" 60 is defined as any physical, visual, electromagnetic or any other form of communication capable of representing the codes that will be transmitted to user validation equipment 50. For example, physical code 60 may be a representation in QR code, DATAMATRIX code, bar code, RFID, among others.

"Container" 61 is defined as an aggregate physical code that references a set of individual physical codes 60.

Furthermore, it is emphasized that, hereinafter, the term "product" is used generically to represent any type of good, product, service or document.

FIG. 1 shows the interconnected processes 100, 200. Process 100, herein referred to as the method of generating and associating codes with products, is initiated by a request 101 from a sequential number block by a client which may consist, for example, of a manufacturer, importer, a notary or an independent professional, among others, interested in obtaining codes for their products.

Thus, a system server 21 generates 102 a binary sequential number block and stores it 103 in a centralized database 22, associating said sequential number block with the client 10. It is essential, however, that the sequential numbers be unique, and that there is a two-way correspondence between each sequential number and each product.

With the sequential numbers stored, the client 10 can request 104 at any time to generate random numbers to be associated with each sequential number determined by him. Thus, the codes associated with each sequential number determined by the client 10 are generated and authenticated. It is worth to highlight that not all block sequential numbers acquired by the client 10 need to be associated with random numbers at the same time.

Upon request 104 of random number generation, the actual generation process 105 is performed by the system server 21 on a number generation system 24, as shown in FIG. 2. In this process, N binary random numbers are generated, where N is the number of codes requested by the client 10. Each random number is made up of M bits, where M is chosen so that it is greater than or equal to the number of bits of previously generated sequential numbers 102.

The generation of random numbers by the number generation system 24 utilizes a physical process for which randomness is an intrinsic property of the process, based on the laws of physics, involving the use of entangled particle pairs or any other quantum processes that allow the audit of its randomness. For example, maximally entangled photon pairs can be used at a certain degree of freedom, such as their polarization, and whose detection process involves the violation of a Bell Inequality, thus ensuring a process of audit of the obtained randomness.

Each random number generated is associated with its respective sequential number, previously generated upon the request of the client 10. The combination of the sequential number and the random number makes up a code 60 that is stored in database 22.

With codes 60 stored in database 22, the client 10 can perform, at any time, an association 106 between product identification numbers—product serial numbers, manufacturing batch numbers, or any other numbers that identify or rate your products—with codes 60 stored. The system server 21 then stores 107 associations of codes 60 to products in database 22.

Asynchronously, from time to time, a hash from database 22 is generated and inserted 108 into a blockchain 23 associated with the client 10. The hash function used must be suitable for encryption processes, i.e., its output must have a fixed number of alphanumeric characters regardless of input size, the likelihood of collision must be negligible and it must be computationally impracticable to obtain the original data from hash knowledge. Some examples of hash functions that can be used are SHA1-SHA5, MD5, BLAKE/BLAKE2, and others.

The identification numbers of products of the client 10 may contain product information such as expiration date, batch, product type, content (for documents), and so on. For products that are not uniquely identified—by means of, for example, serial numbers—such as food or some types of medicine, the manufacturing batch number of the products may be used instead of the serial number of the products of the client 10.

It should be noted that the serial number of client 10 products has no relation to the sequential number generated 102 by the system server 21.

After the association between codes 60 and product serial/batch numbers (identification numbers), the client 10 then performs a process of printing a physical representation of code 60 that can be read by a validation equipment 51 from distributor 30, seller 40 and/or user 50. For example, the QR Code or Datamatrix formats, or any other representation capable of storing large code.

In the case of product groupings for transportation, storage, exportation, etc., the client 10 can initiate a process of associating a code group with a single code, called container code 61. This container code 61 will have associated to itself in the database 22 all product codes chosen by the client 10.

Figure 3:
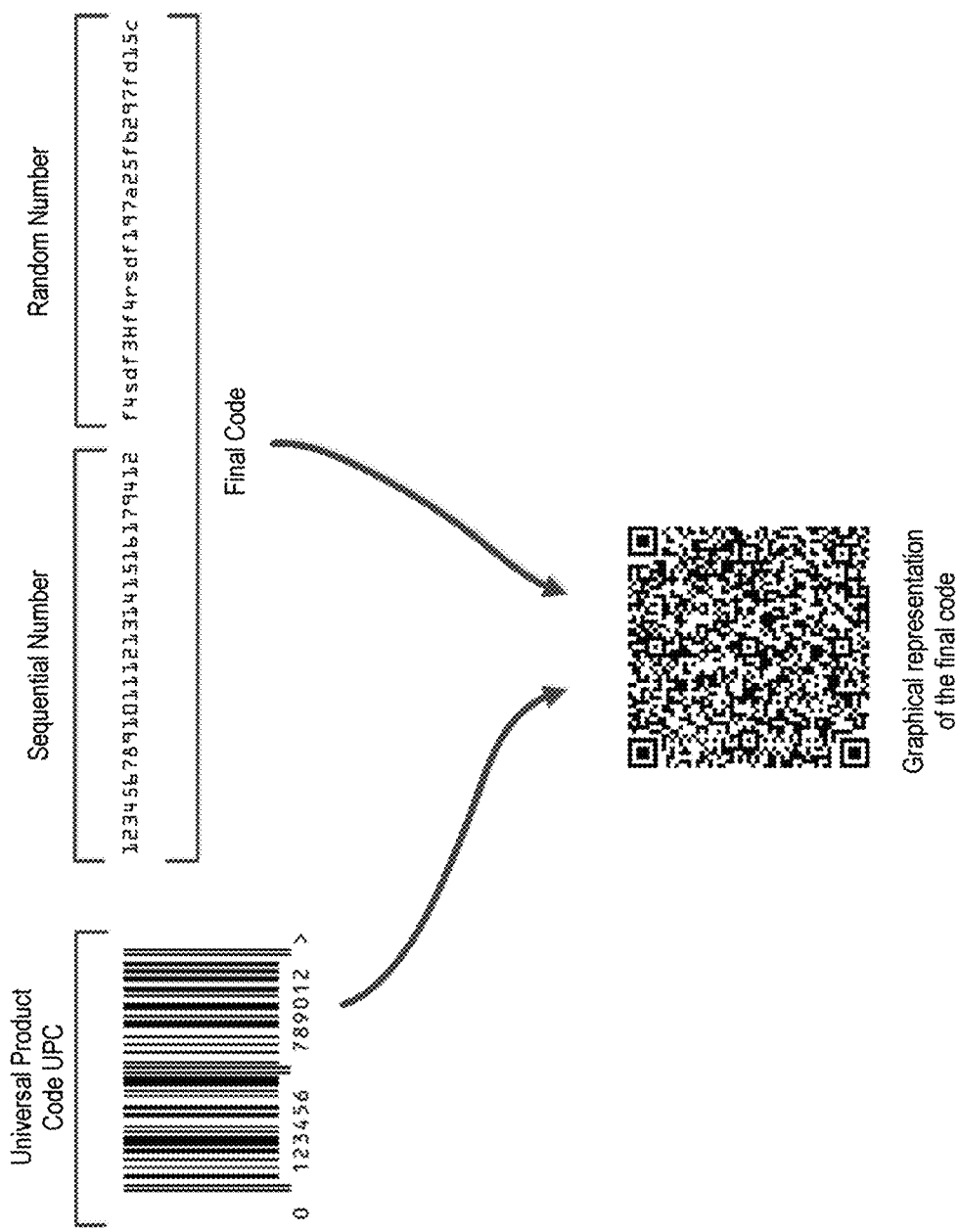
FIG. 3—a graphical representation of the final code.

As with the code printing process, the client 10 initiates a process for printing container codes 61. This process results in a physical representation of container code 61. Alternatively, other physical representation technologies may be employed for writing and reading container code 61 such as RFID, simple barcodes, USB memories, etc. In one embodiment of the present invention, the graphic representation format of the final code 60 or container code 61 should contain the following information: the system generated code (sequential number+random number) and the UPC code (Universal Product Code) for product recognition, acting as the product identification number of the client 10. This can be seen in FIG. 3. The presence of the UPC code within the graphical representation will allow a single scan that contains all the information necessary for the full operation of the system, just like the systems used by all sellers that use UPC code for their selling controls.

Figure 4:
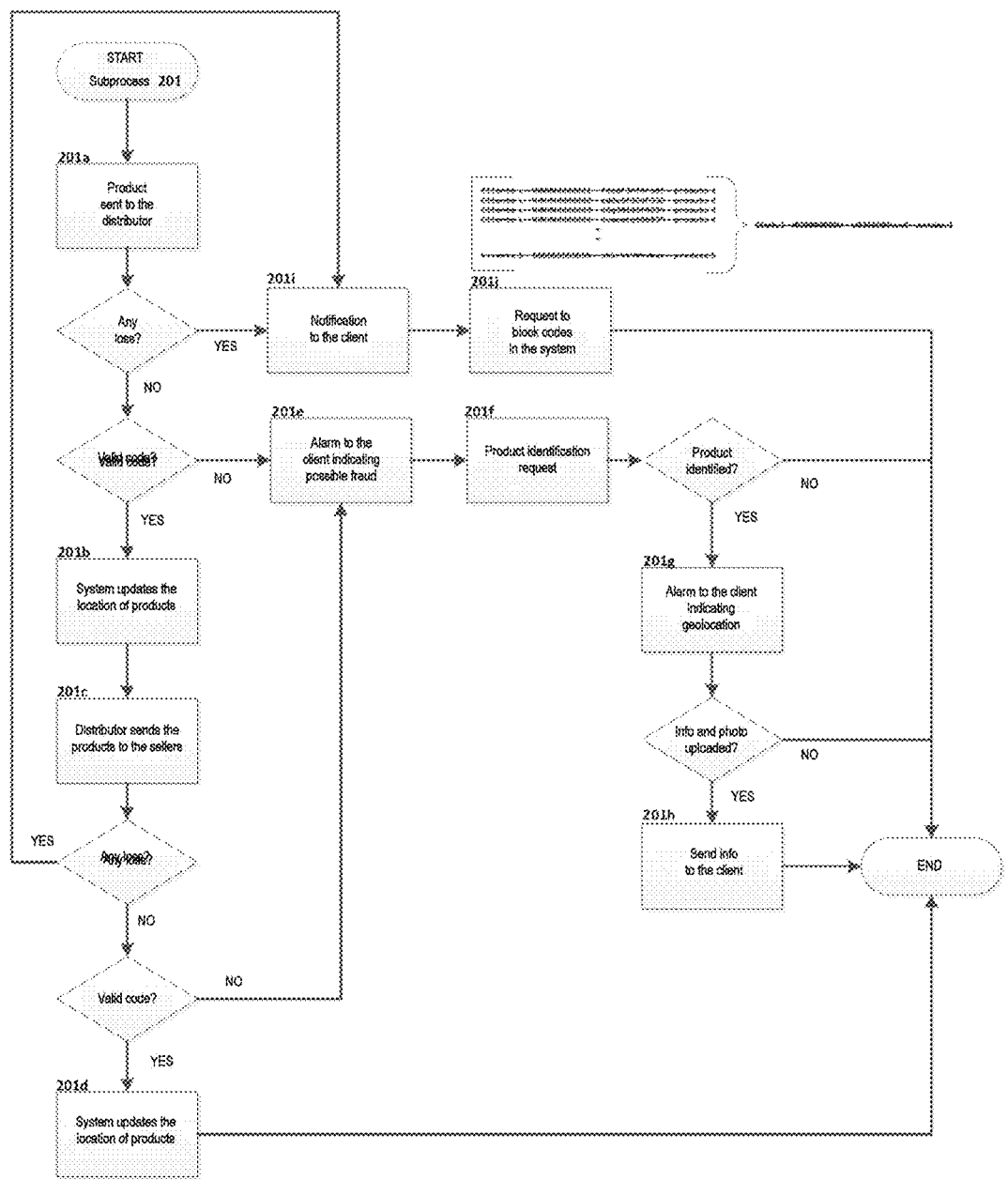
FIG. 4—a flow chart of the first subprocess shown in FIG. 1.

Thus, process 200 is initiated as shown in FIG. 1. Process 200 is initiated by subprocess 201, which is shown in detail in FIG. 4, and described below.

Products, duly identified by their physical representations of code 60 and/or their physical representations of container code 61, are finally sent (201a) by the client 10 to a distributor 30. The information that the shipment was made is saved to database 22.

Distributor 30 receives a notification from system server 21 that a product shipment 201a has been sent to distributor 30 by the client 10.

If the distributor 30 does not receive the charge on the date indicated by the system, or receives notification of a lost or stolen event by any means, the loss or theft is notified 201i to the client 10. In this case, the client 10 requests the server system 21 to block 201j the codes associated with the lost products, which immediately updates the centralized database 22 with the block information (a status "blocked" is generated). Thus, any attempt to sell the lost products will be detected by the validation application 52 whenever a user 50 queries the code of a lost product using a validating equipment 51.

If the products reach the distributor 30, that is, in case there is no loss of products, the distributor 30 reads physical codes 60, 61 using a validation equipment 51. If the code of any product or batch of products is invalid, an alarm is sent 201e, by the system server 21, to the client 10 indicating a possible fraud. The system server 21, through validation application 52, requests 201f to distributor 30, in this case, that a product identification information, such as a photo thereof, is sent to the system server 21. In case of identification of the product, an alarm is sent 201g by the system server 21 to the client 10 indicating geolocation data. Additionally, if some other relevant information is obtained, such as a photo of the product, it will be sent 201h to the client 10.

If the codes are valid, the system updates 201b the current location of the products or batch of products in database 22, using, for example, the geolocation mechanisms of the validation equipment 51. The distributor 30 then sends 201c the products to the seller 40.

Similar to the distributor 30, if the seller 40 does not receive products shipped 201c by the distributor 30, or receives notification of an event of loss or theft by any means, the loss or theft is notified 201i to the client 10. In this case, the client 10 requests system server 21 to block 201j the codes associated with lost products, which immediately updates centralized database 22 with block information. Thus, any attempt to sell lost products will be detected by the validation application 52 whenever a user 50 queries the code of a lost product using a validating equipment 51.

If the products are not lost, the seller 40 receives them and checks the validity of physical codes 60, 61 through a validation equipment 51. If the code of any product or batch of products is invalid, an alarm is sent 201e, by the system server 21 to the client 10 indicating possible fraud. System server 21, through validation application 52, requests 201f to the seller 40 that an additional product identification information, such as a photo of the product, is sent to the system server 21. In the case of product identification, an alarm is sent 201g by the system server 21 to the client 10 indicating geolocation data. Additionally, if some other relevant information is obtained, such as a product photo, it is sent 201h to the client 10.

Accordingly, any attempt to sell the fraudulent products will be detected by the validation application 52 whenever a user 50 queries the code of a fraudulent product using a validation equipment 51.

In case of valid codes 60, 61, the system updates 201d the location of the products in database 22 and the seller 40 can thus store the product so that its sale to the client is viable.

Thus, at the end of subprocess 201, since the product is in sales area of the seller 40, a hash from database 22 is generated 205 and inserted into the blockchain associated with the client 10. Hash generation is done asynchronously from time to time. If a user 50 is interested in the product and decides to query its physical code 206 using its validation equipment 51, the code is sent to system server 21 which in turn queries database 22 for authenticity of code 60.

Figure 5:
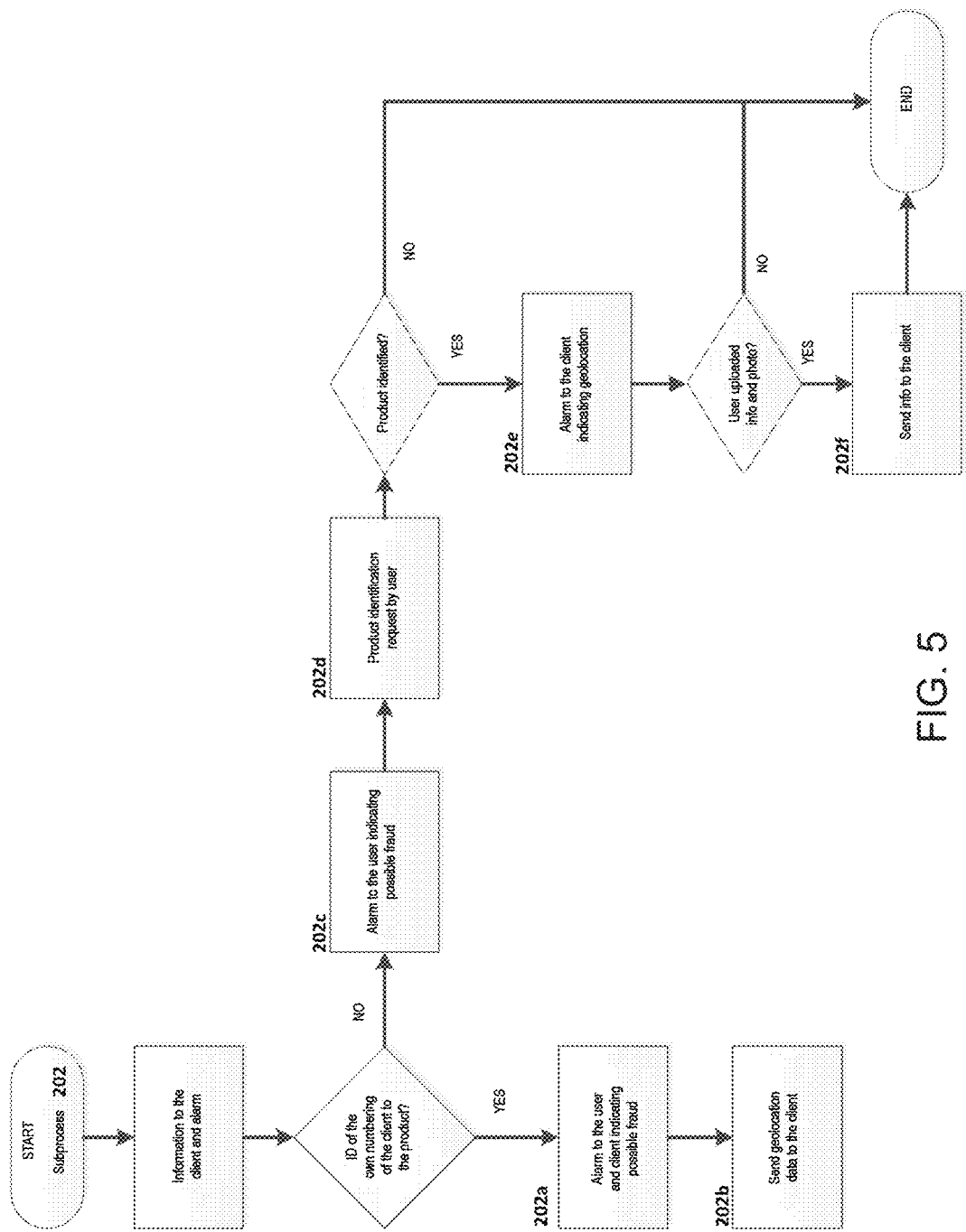
FIG. 5—a flow chart of the second subprocess shown in FIG. 1.

If not, that is, if the system server 21 returns to user 50 an information that the code is invalid, a subprocess 202, shown in FIG. 5 and described below, is initiated.

In subprocess 202, the system checks whether own numbering of the client 10 for a product or product batch—serial number, batch number, and so on—is valid. If so, an alarm is sent 202a by the system server 21 to both client 10 and user 50 indicating possible fraud. For client 10, geolocation data from user 50 is still sent 202b.

On the other hand, if the own numbering of the client 10 for the product is not valid, an alarm is sent 202c by the system server 21 to user 50 to indicate possible fraud. Additionally, system server 21, through validation application 52, requests 202d that the user 50 provides product identification information, such as a description of the product or its UPC code, to be sent to system server 21. If the user 50 provides the product identification, an alarm is sent 202e to the client 10 indicating the geolocation of user 50. User 50 may also provide other information, such as a photo of the product to the client, if desired. Product identification information is sent 202f by the system server 21 to the client 10. Identification of the possibly fake product and its association with the likely manufacturer will be made by the application through image recognition, UPC code or any other means that can identify a product. If the application/system recognizes the product and the same is part of products that use the code system described here, the alarm can be sent automatically.

Figure 6:
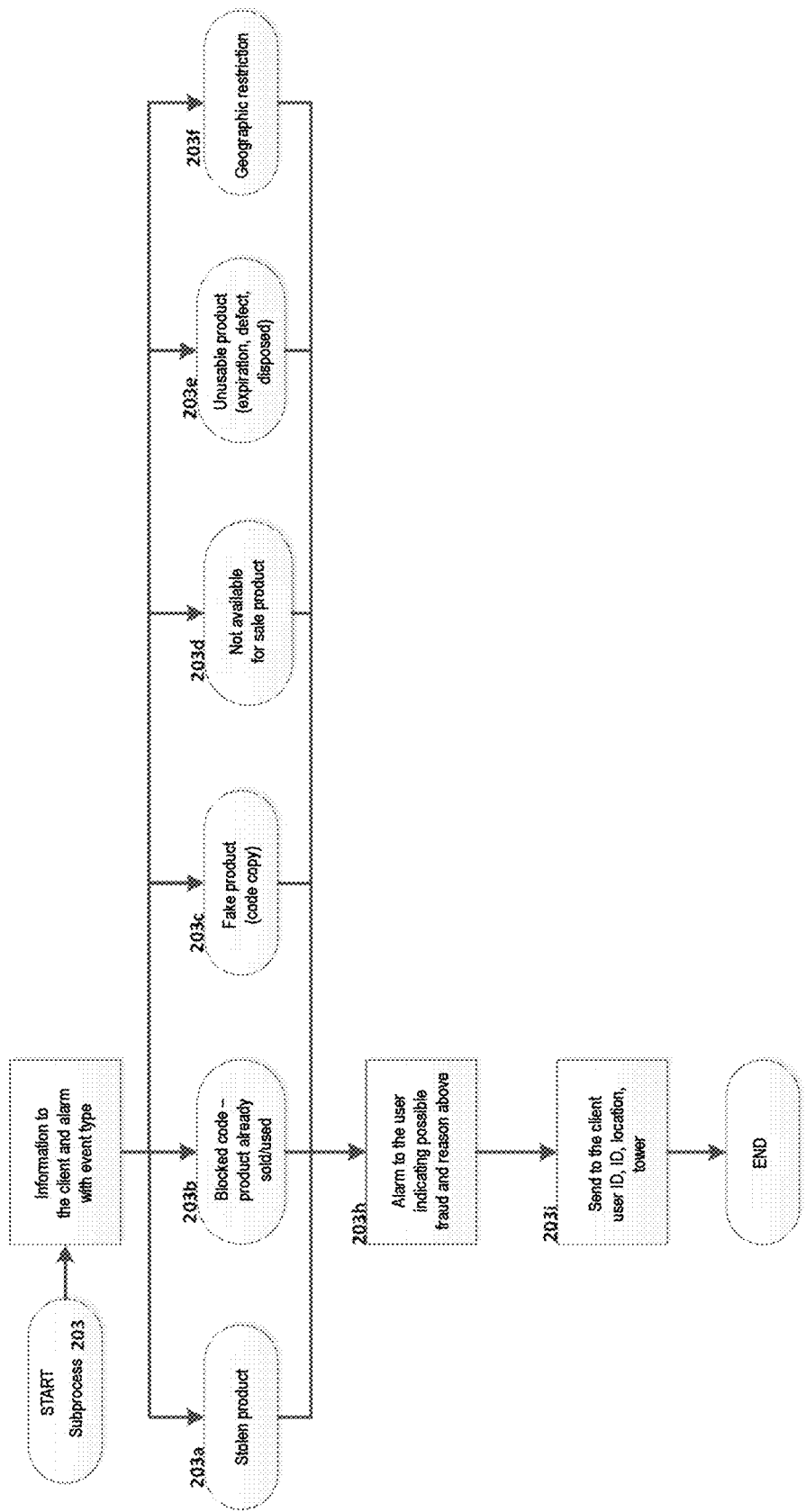
FIG. 6—a flow chart of the third subprocess shown in FIG. 1.

Returning to process 200 shown in FIG. 1, if system server 21, in response to query 206, returns to user 50 that the code is valid, subprocess 203, shown in FIG. 6, and described below is initiated.

Subprocess 203 verifies that, in addition to the code validity information, the system server 21 also returns to user 50 a "special event" or additional alarm as well as what this special event is.

A special event is the identification and dispatching of an additional alarm to user 50 containing information about the product 203h, where the additional alarm is one of: stolen product alert 203a, already sold product code (used product) 203b, copied code (fake product) 203c, product unavailable for sale 203d, unusable product 203e, geographically restricted product 203f, and more. In this case, the special event is also sent 203h to the client 10 together with the sending 203i of user identification data 50 and user geolocation information 50/product.

A code belonging to a stolen product 203a is understood to mean that in any part of the transport chain between the client 10 and the seller 40, a theft communication has occurred to the client 10 that in turn informs the system that the respective codes should be blocked—by changing product status in database 22—due to theft.

The already sold/used product code 203b is that which, in database 22, is identified as a code associated with a product already acquired in the past and reported to the system by any user, so that the status of the product associated to this code is marked as "used" in database 22.

The copied code 203c, in turn, is that code that has been queried multiple times and identified as a product already sold or queried in different geographical locations by different users. The definition to consider a copied code may comply with certain predefined query patterns in the system.

Unavailable product 203d is any product containing a code with this information, provided by the client 10, and present in database 22.

The unusable product 203e is any product that contains a code and which in database 22 is a product that has been disposed of or found unfit for consumption. For example, the client 10 may recall or suspend sales of products identified as unfit for consumption, and immediately block sale to clients in situations such as identifying food contamination, failures of car safety devices, manufacturing defects already identified by the manufacturer, etc.

Finally, geographic sales restriction 203f is an information provided by the client 10 and associated with codes of the products that specifies a geographical area in which sale is permitted. For example, exportation products that cannot be traded on national territory by law, various regulations, tax reasons, among others.

If the code query is valid and there is no special event, that is, subprocess 203 returns no event, user data 50 is sent 207 by the validation equipment 51 to the system server 21 and stored in the database 22 together with date, time and geolocation data of user 50. In addition, user data 50 information about the product content, if any, are also sent 207. Product query information is then sent 208 to the client 10 and identification data of the user 50, date, time and geolocation of the product are updated onto the database 22.

If there is product content information, such product content associated with the code is displayed 209 to the user 50. If the displayed content is not in accordance with the physical product in his hands, user 50 reports to the system the discrepancy, which prevents 210 from changing product status to "blocked" in the database 22. Additionally, all the information about date, time, and location information of user 50 is sent 210 by the system server 21 to the client 10.

Otherwise, that is, if the content displayed conforms to the physical product in the hands of user 50, the user, after receiving information about the product content and performing his own validation, has the option to request the product purchase. In this case, user 50 confirms to system server 21 that he is purchasing the product, this information being stored in database 22 together with date, time, and geolocation data of user 50. From that moment on, a status of "acquisition pending" is generated by the system server 21 and the product code is marked in database 22 with this status.

After the purchase requisition has been made by the user 50, the seller 40 is informed 211 via the system that a purchase requisition for a product in his custody has been requested by a particular user 50, generating a status of "purchase pending". Understanding that this is a legitimate transaction, the seller 40 confirms the sale of the product and the definitive transfer of ownership of the product is then authorized, and a notification is sent to the system server 21 so that an association 212 of the product code to the user 50 is made. Next, database 22 is updated with the product status being changed to "blocked". Accordingly, the product may no longer be marketed, except with the express authorization of its new legitimate owner, that is, user 50.

Figure 7:
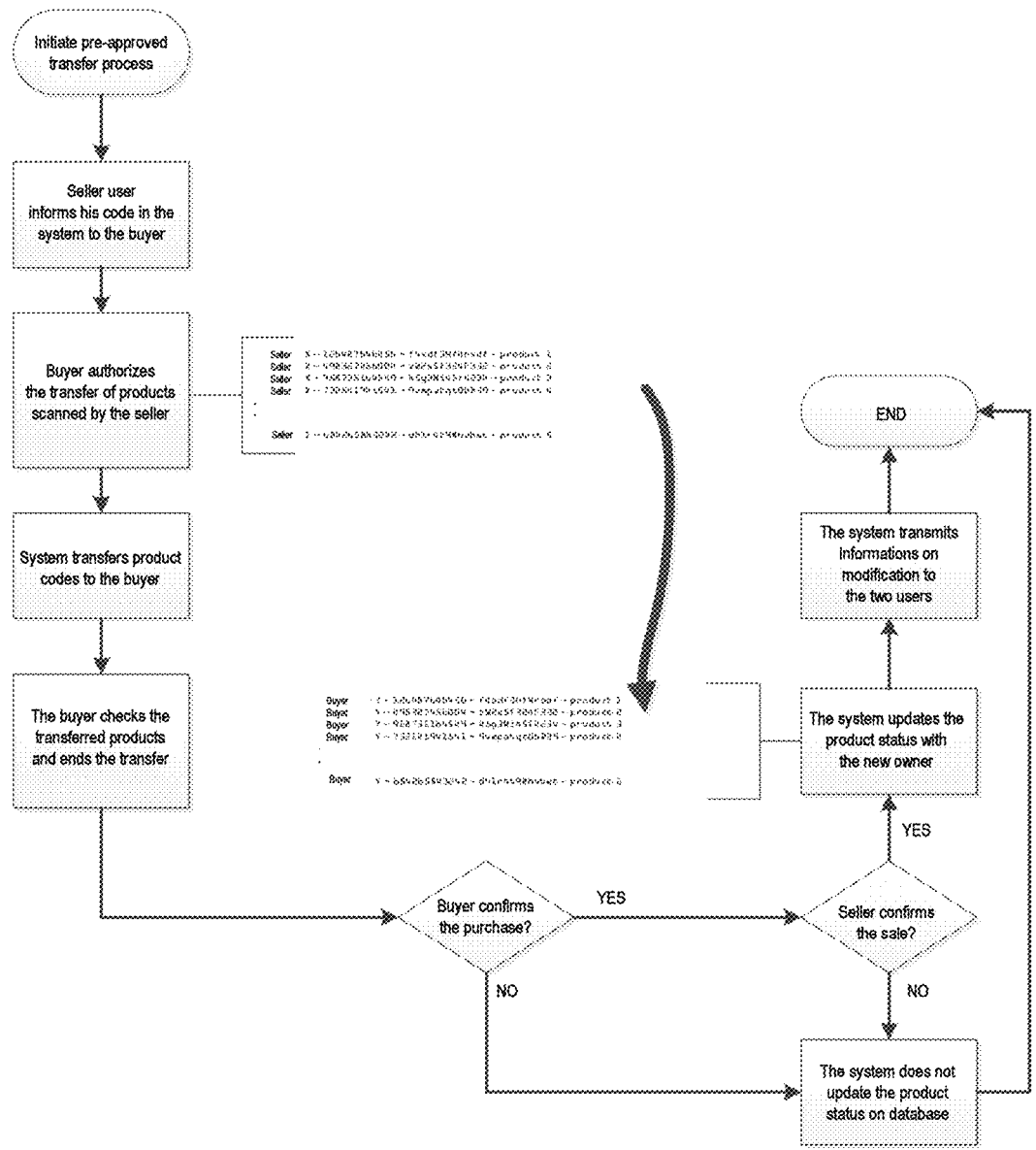
FIG. 7—a flow chart of the process of transferring ownership of one or more products from a seller to a buyer.

If the seller 40 does not confirm the sale of the product, the product remains in the status of "purchase pending". It is also possible that multiple products are scanned by seller 40 and that, after payment by user 50, such products have their ownerships transferred to user 50 in bulk. Illustratively, FIG. 7 shows the steps of transferring ownership of multiple products from one seller to one buyer.

The authorization to transfer ownership between seller 40 and user 50 can also be done through integration with the sales system of the seller 40. Accordingly, the point-of-sale systems then identify each product by its physical code 60 and not only by its barcode (UPC). Please note that the UPC code is contained in the system-generated physical code 60 and is sufficient for all operations currently used by sellers 40. It is important to emphasize that in high value products and/or which contain additional actions, such as password submission, the seller 40 benefits directly, as any thefts in his store render the product unusable.

Figure 8:
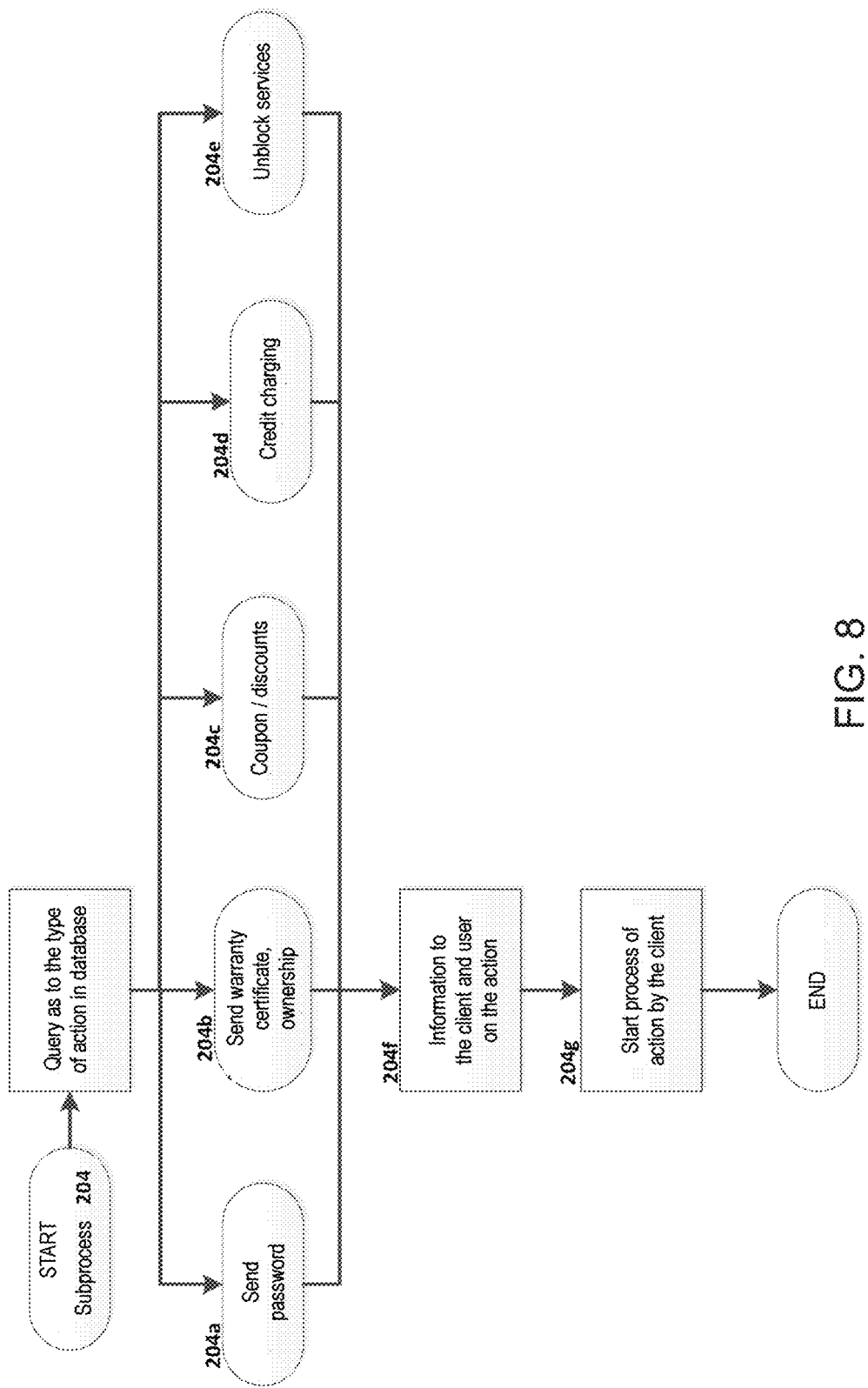
FIG. 8—a flow chart of the fourth subprocess shown in FIG. 1.

After completing the steps of associating 212, by the system server 21, the code 60 of the product with user 50, and changing product status 212 to "blocked" on database 22, the system server 21 checks for occurrence of an "additional action". If so, subprocess 204, shown in FIG. 8 and described below, is initiated.

Subprocess 204 identifies in database 22 which additional action the acquired product needs. An additional action can be one of: sending a password 204a, sending a certificate of guarantee or ownership 204b, sending coupon/discount 204c, credit upload 204d, unblocking services 204e, among others. Both user 50 and client 10 receive 204f the appropriate information corresponding to each action. Upon receiving such information, the client 10 initiates 204g a process for performing said action.

Sending a password 204a is defined as sending to user 50 an alphanumeric sequence, in any physical representation, that allows the user to fully use the acquired product. For example, a television or smartphone that requires a password for its initial activation and full operation.

Sending a certificate of guarantee or ownership 204b is defined as sending to user 50 a document attesting to the ownership of the product with its respective warranty terms.

Sending coupon/discount 204c is defined as sending an alphanumeric code that allows client 50 to gain some benefit. For example, a discount coupon on the purchase of other products, frequent flyer miles, redemptions, and more.

Credit upload 204d is understood as the sending of an alphanumeric code that allows the user to acquire products on certain systems, such as downloading music, software, movies, games, etc., or buying minutes on pre-paid mobile phones.

Unblocking services 204e addresses to the sending of an alphanumeric code that allows the use of any type of service, such as after sales, insurance, technical assistance, support, among others.

At the end of the product acquisition process 200, database 22 is updated with all relevant information, including an association between the product and user 50 and data on the conditions of sale, especially date, time and geolocation. From that moment on, it becomes apparent in the system that user 50 is the rightful owner of the acquired product. Thus, the system now contains an inventory of all acquired products and their respective owners.

User 50 may also choose not to acquire the product. In this case, the product code remains available in the system for future acquisitions, but the code query event is stored in database 22.

Asynchronously, from time to time, a hash of database 22 is generated 213 and inserted into blockchain 23 associated with the client 10, as previously described.

Figure 9:
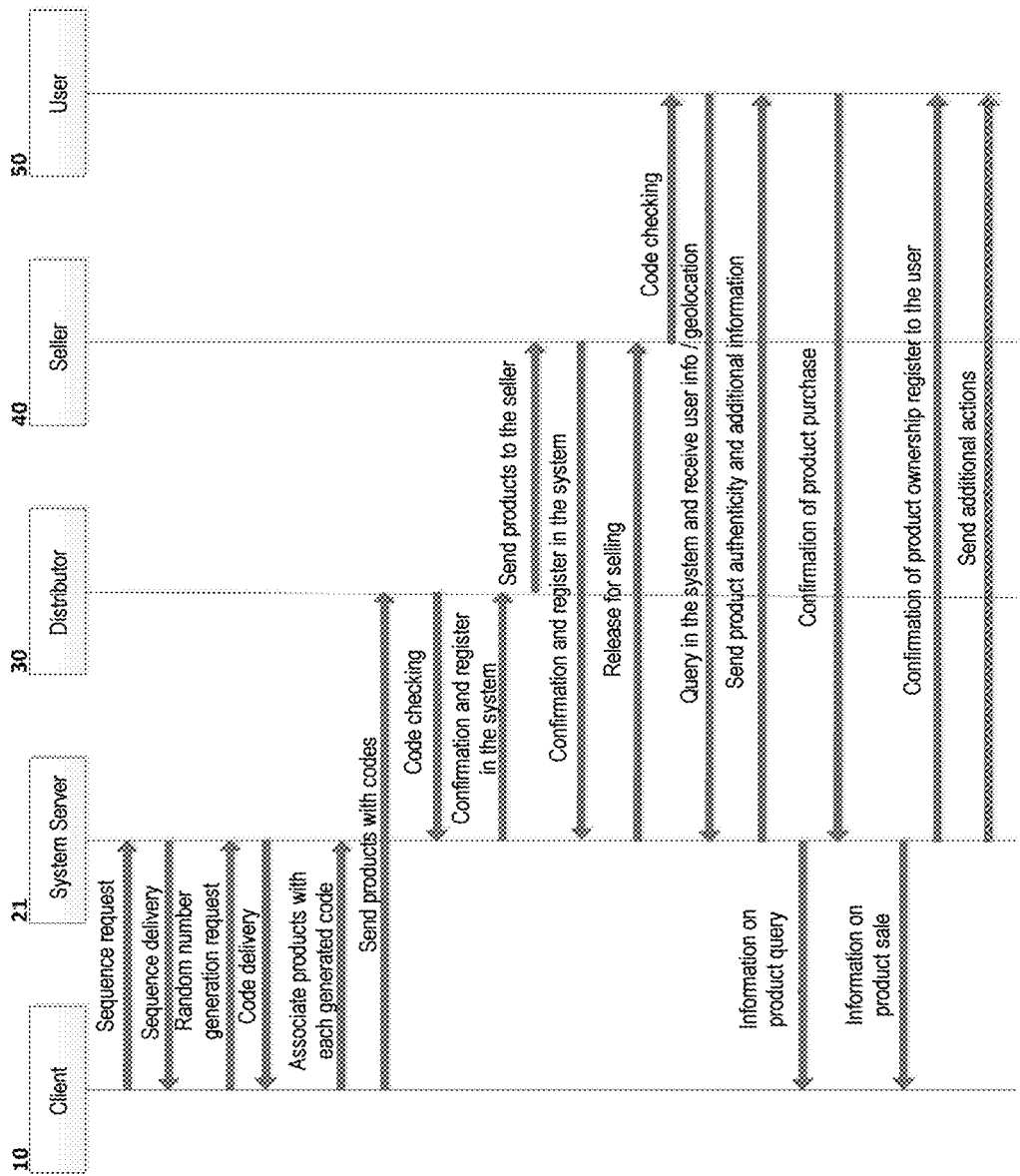
FIG. 9—a flow chart of the product tracking method of the present invention.

FIG. 9 shows an example of the flow of information exchanged between the various agents (client 10, system server 21, distributor 30, seller 40 and user 50) of the product tracking method proposed by the present invention.

In any of the previous cases where geolocation data is obtained, system server 21 may choose to use the functionality of the encounter validation process 300, as shown in detail in FIG. 10. In this process, a sender 301 and a recipient 302 are necessary, each having a device with an internet connection. Both devices must have a display or display device, such as smartphones, monitors, or televisions. The system server 21 sends a set of codes to the sender 301, which displays them on its equipment as QR Codes in a random sequence. The recipient 302 reads QR Codes from the equipment display of the sender 301 in succession and assigns each one a timestamp containing the exact time as accurately as possible as allowed by the validation equipment 51, in which each reading was performed. Next, the recipient 302 sends to the system server 21 each code read with its respective timestamp. From the analysis of the compatibility between each code and its respective timestamp, the system is able to verify whether the encounter between the devices of the sender 301 and the recipient 302 actually occurred.

Figure 11:
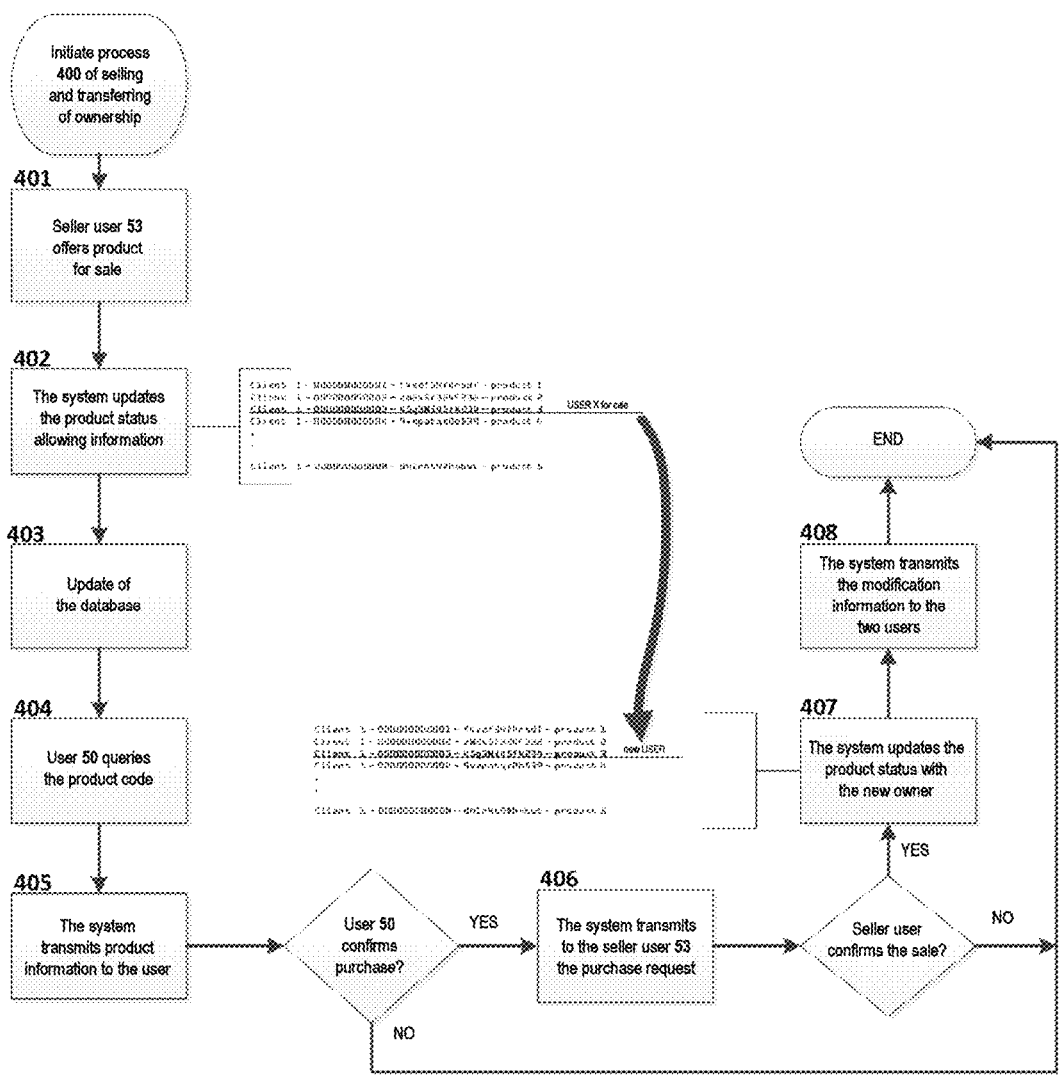
FIG. 11—a flow chart of the ownership transfer process.

FIG. 11 shows a process 400 of selling and transferring ownership of a product. After acquiring a product, user 50 may choose to sell it as a used product. In this case, the product owner user now acts as a seller user 53 and the buyer user as the user 50.

Initially, seller user 53 informs 401 to system server 21 by means of validation application 52 that he will place a particular product from its inventory for sale. At this time, the system updates 402 the product status, and authorizes the disclosure of all product data, such as date of acquisition, previous owners, place of acquisition, warranty certificates (if any). In addition, the code associated with the product is unblocked (status changed to allow the sale) and database 22 is updated 403.

When a buyer user 50 queries 404 for the product code, the system transmits 405 via the validation application 52, all information regarding the product for the user 50.

The buyer user 50, based on the received information, decides whether to make a purchase requisition or not. If so, the system transmits 406 to the seller user 53, the purchase order.

Subsequently, seller user 53 accepts or does not accept the purchase requisition received, based on direct negotiation between the parties involved. If the purchase is authorized, the system updates 407 the product status with the new owner, transferring ownership from seller user 53 to buyer user 50. Finally, the system transmits 408 modification information to both users.

APPLICATION EXAMPLES

Process of Tracking the Distribution Chain of a Drug

The tracking method of the present invention may be applied, for example, to a drug importer wishing to track the entire distribution chain of one of the products. Suppose the importer requests one million random numbers and, together with the same number of serial numbers, generates a printed code in the form of a QR Code for each of one million packages of his product. Half of this quantity is sent to two distributors, A and B, and products shipped to each of the distributors are grouped into a single container.

This way, as soon as Distributor A receives his container with five hundred thousand products, he uses the app on his smartphone to scan the container QR Code. In response, he gets the information that the code is legitimate and the importer also gets the information that the container has been correctly received by distributor A.

Distributor A then removes the products from the container and ships them to hundreds of drugstores. A consumer at one of these drugstores eventually performs a QR Code check printed on the drug packaging. The system query returns information that the drug is legitimate; in addition, the importer gets the information that one of his drugs was scanned by a user right at that drugstore that day and time. If the consumer decides to purchase the drug, the code associated with it will be blocked and the importer will also be notified of the event.

However, a cargo theft gang intercepts the truck transporting the units destined for distributor B. Once aware of the event, distributor B accesses the system and disables (blocks) the container code that was intended for it, signaling that the cargo was stolen. Eventually, in a drugstore in another corner of the country, a consumer scans the QR Code of one of the stolen products. The system readily identifies that this code belonged to the container that was stolen and therefore the consumer receives the information via the smartphone application that it is a stolen drug.

Figure 12:
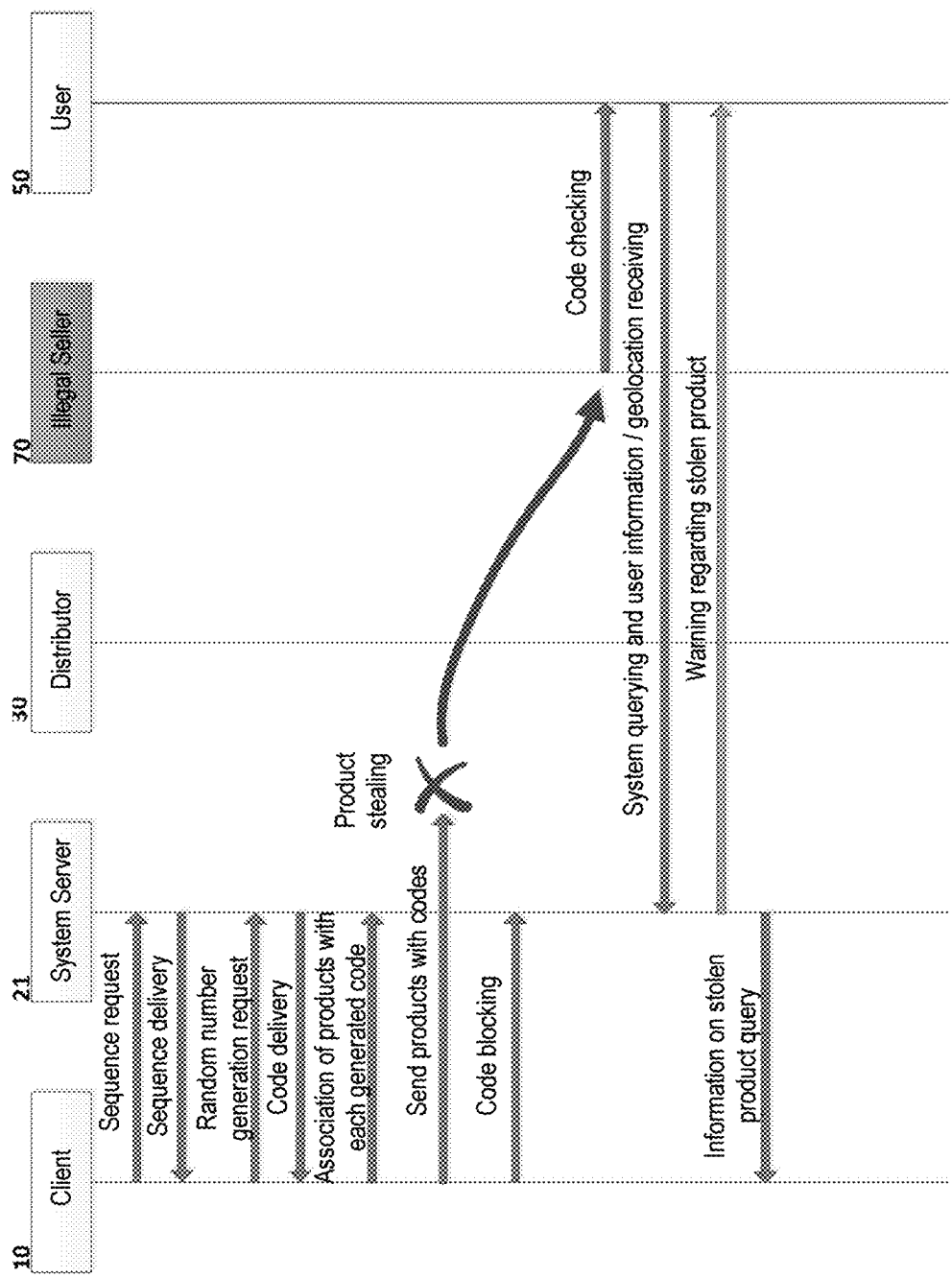
FIG. 12—a flow diagram of the product tracking method when the product is lost.

In addition, the importer becomes aware of the geographical area in which one of his stolen drugs are being sold. This process can be seen in FIG. 12, where an illegal seller 70 is presented, that is, any unauthorized party who has illegally obtained products containing physical codes 60 and who assumes or attempts to assume the role of the seller 40.

Process of Acquiring a Television Set

In a second application example, a consumer C1 purchases a TV set TV1 at an appliance store. Before making a purchase, the consumer uses the system application on their smartphone to check the QR code TV1. The system returns the information that the product is genuine and available for sale. Once the purchase is made, which is confirmed in the system by the store, the consumer C1 receives, in his application, an alphanumeric sequence, hereinafter referred to as "password", which will be required to unblock the product.

The alphanumeric sequence that makes up the password will be randomly generated, for example, using the same process of generating the random component of the codes. Thus, when consumer C1 arrives at his home and finishes the process of installing his TV TV1, at the moment the product is turned on, an indication will appear on the screen: "Enter password". Armed with the password previously received in the application of his smartphone, consumer C1 types it and unblocks the TV TV1 so that he can use it normally.

Considering now the case where a consumer C2 purchases, in another establishment, a second original TV TV2, the same model as TV1. However, although original, the model in question was never produced for marketing purposes; this is a showpiece originally intended for an electronics fair, in which the store participated, but was never connected or used. The consumer and seller do not use the system at any time during the sales process. The consumer C2 then proceeds to the location where the TV set TV2 will be installed and, after the installation is completed, chooses to test its operation. As soon as the product is turned on, the message "Enter password" appears on the screen. Since the model has not been associated with any point of sale in the system, it is not listed as available for sale and therefore its code is "blocked". Thus, even if the consumer C2 reads the QR code of the product TV2 with the application on his smartphone, it will not be able to obtain the password.

Prescription Authentication Process

Figure 13:
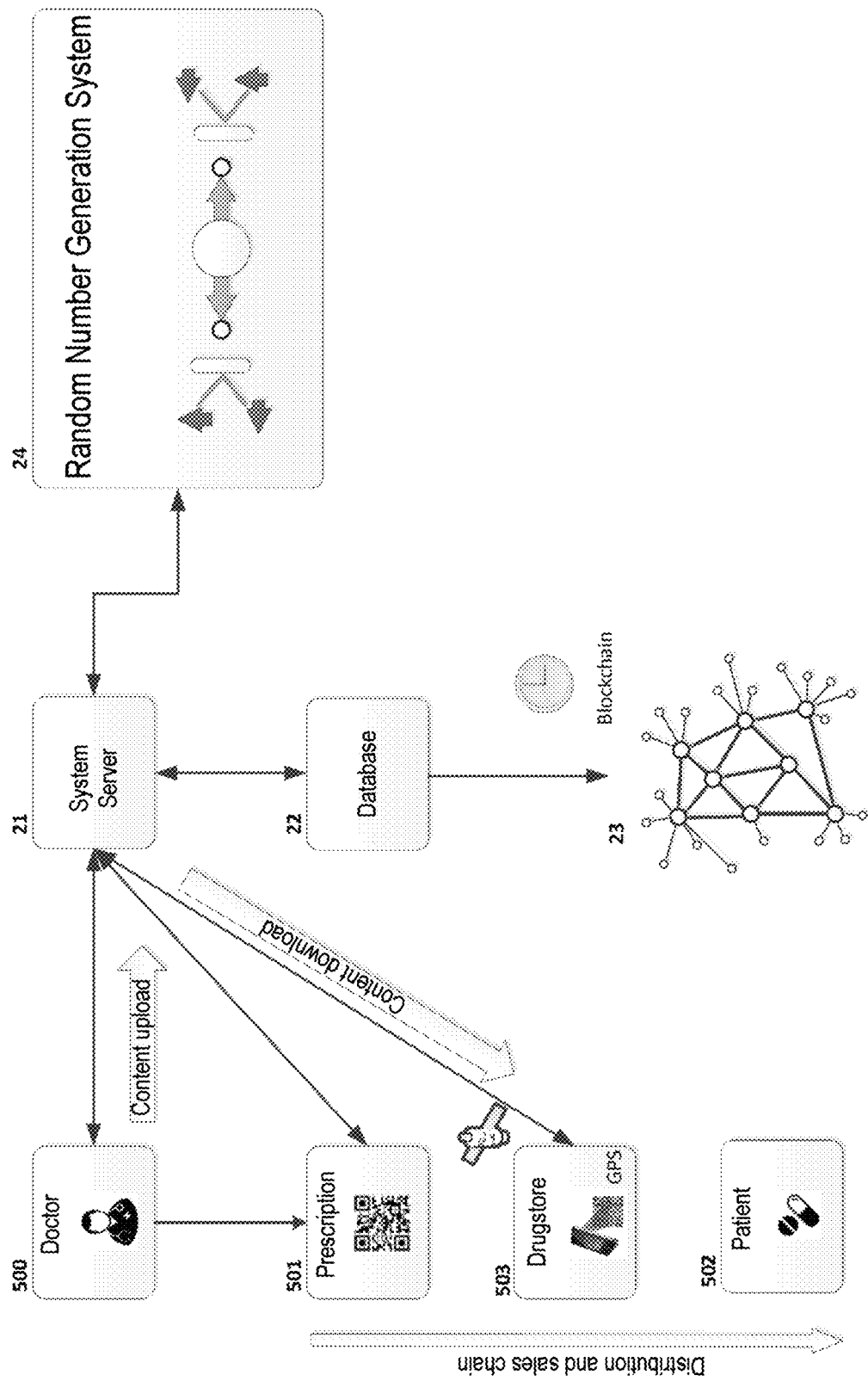
FIG. 13—a block diagram of an example application of the product tracking method of the present invention for prescription authentication.
Figure 14:
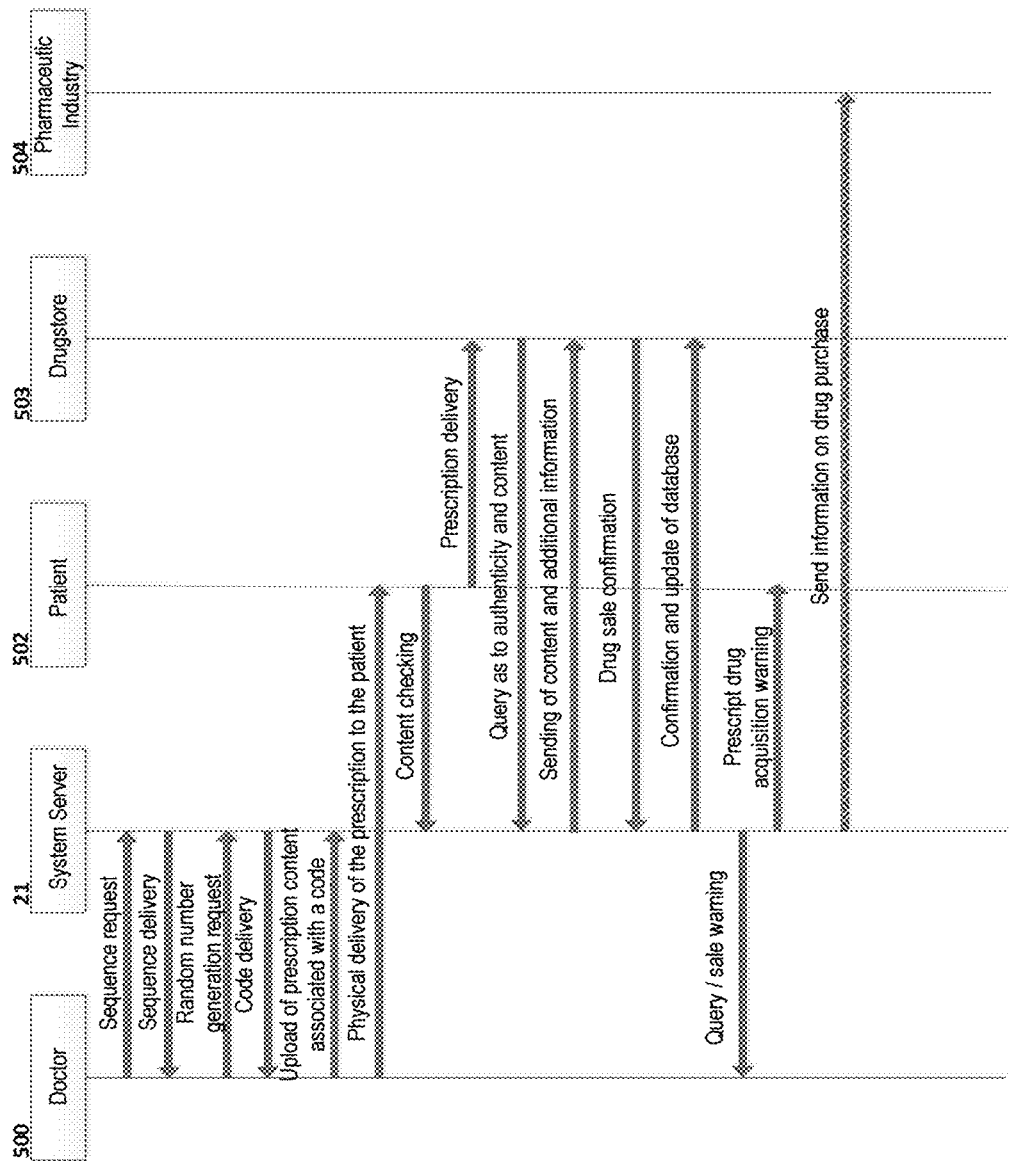
FIG. 14—A flow chart of the example of FIG. 13.

In a third example of applying the tracking method, illustrated in FIGS. 13 and 14, a doctor 500 requests one or more sequential numbers from system 21 for the purpose of document validation—in this case, of prescriptions 501.

Subsequently, doctor 500, as needed, requests the association of random numbers with their sequential numbers. At this moment, through the system interface on his computer, the doctor 500 selects a particular code and associates it with a document 501, transmitting it to the system. This document 501 can be a scan of a physical document or a document produced directly on his computer or on the system itself. At this moment, additional information such as patient name, prescription validity, and so on may also be transmitted to the system.

After this step, the doctor 500 physically delivers the prescription 501 on paper to his patient 502, containing the associated code in QR Code format. The patient 502 then checks its contents and then goes to drugstore 503 to purchase the drugs prescribed by the doctor.

Upon receiving the prescription 501 from the patient 502, the drugstore 503 queries the QR Code printed on document 501 and, using the system 21 application, compares it to the content reported by system 21. In addition, the drugstore 503 receives information about the doctor 500 issuer of the prescription, such as that prescription 501 has never been used, is intended for the buyer and is valid, among others. If all the information received is considered pertinent, the drugstore 503 proceeds with the sale of the medication to the patient.

Next, the sale is reported to system 21 so that the doctor 500 and the patient 502 receive, in their respective applications, information that the sale has taken place. In addition, the pharmaceutical manufacturer (or its importer) also receives notification of the sale.

Optionally, both at the step where the doctor 500 issues the prescription and at the time of purchase of the drug by the patient 502, the country's drug regulatory authority may be notified.

Process of Transferring Ownership of a Watch

In a fourth example of applying the tracking method of the present invention, a legitimate owner of a Swiss watch, purchased some years ago and previously registered in that system, decides to put the watch for sale. For this, he first accesses the system and informs that the code associated with his watch is now unblocked, and thus allows the sending of information about the entire history of the watch since its manufacture. Then anyone interested in purchasing the product can scan its QR Code using the system application installed on their smartphone and verify the information that is transmitted by the system to the potential buyer.

If the purchase is confirmed, the system transmits to the owner of the watch a ownership transfer request (purchase). If the watch owner confirms the financial transaction for the sale of the watch, the system updates the status of the watch in which the new owner will now appear. Then a confirmation message is sent to both parties.

From this moment on, the new owner will have access to all information regarding the watch such as certificate of origin, warranty certificate, among others.

Defective Product Relapse Process

In a fifth example of the tracking system application of the present invention, a consumer C purchases a new vehicle from a dealership. One year after the purchase, the manufacturer discovers a serious defect in a part on all vehicles manufactured within a certain period of time, including the vehicle purchased by the consumer. At this point, the manufacturer decides to make a recall for repairing the defect.

In this way, the manufacturer updates the system status of all vehicles affected by the defect. Immediately, customer C receives a notification through his application on his smartphone, informing him of the need to show up with his vehicle to a dealer for replacement of the defective part. This example illustrates the importance of the manufacturer having a direct communication channel with the consumer.

Having described preferred embodiments, it should be understood that the scope of the present invention encompasses other possible variations, being limited only by the content of the appended claims, including possible equivalents therein.

The invention claimed is:

1. A method for tracking products comprising:
generating, by a system server, a plurality of generated numbers comprising a sequentially generated first part and a randomly generated second part, and generating a plurality of codes based on the plurality of generated numbers;
associating, by a client, at least one code of the plurality of codes with at least one product of a plurality of products;
storing, by the system server, the associated at least one code with the at least one product in a database;
periodically generating a hash of transactions made in the database, and inserting the generated hash into a blockchain associated with the client;
sending, by a sender and to a recipient, the at least one product associated with the at least one code;
checking, by the system server, for a loss or theft of the at least one product sent by the sender to the recipient;
in the absence of any loss or theft, and after receiving the at least one product by the recipient, checking, by the recipient, a validity of the at least one code of the at least one product by means of a validation equipment;
performing a first alarm action for the client when the code is invalid, or updating, by the system server, the current geolocation data of the at least one product in the database when the code is valid;
checking, by a user, the validity of the at least one code of the at least one product by means of the validation equipment;
performing a second alarm action for the client and for the user when the at least one code is invalid, or checking, by the system server, if an additional alarm has occurred when the at least one code is valid;
performing, by the system server, the additional alarm in the event the additional alarm has occurred, or sending, by the validation equipment, identification data of the user, a date, a time and the current geolocation data of the at least one product to the system server, and sending, by the system server, product identification data and, if available, product content data, to the user, in the absence of the additional alarm;
sending at least one product enquiry information to the client and updating the identification data of the user, the date, the time and geolocation of the at least one product in the database;
confirming, by the user to the system server, that a purchase of the at least one product associated with the at least one code is validated;
sending, by the system server to a seller, information that a purchase requisition for the at least one product has been requested, and generating a "pending purchase" status associated with the at least one product in the database;
when the purchase of the at least one product by the seller is confirmed, associating, by the system server, the at least one code with the user, and changing the status to "blocked" in the database;
when the status has been changed to "blocked" in the database, checking, by the system server, if there is an additional action; and
performing, by the client, the additional action,
wherein the step of performing the second alarm action for the client comprises:
checking, by the system server, the validity of a client's own code for the at least one product;
notifying, by the system server, to inform the user and the client of a possible fraud when the client's own code for the at least one product is valid, and sending, by the system server to the client, the current geolocation data for the at least one product;
notifying, by the system server, the user of a possible fraud, when the client's own code for the at least one product is invalid;
requesting, by the system server to the user, that the user identify the at least one product, in response to the determination that the client's own code for the at least one product is invalid,
providing the client the current geolocation data of the at least one product, in response to the determination that the client's own code for the at least one product is invalid when the at least one product is identified by the system server,
sending data requested from the user to identify the at least one product from the system server to the client when the user uploads the data requested from the user to identify the at least one product for the at least one product, in response to the determination that the client's own code for the at least one product is invalid.

2. The method according to claim 1, wherein the step of generating, by a system server, the plurality of generated numbers further comprises:
storing, by the system server, the plurality of generated numbers in the database, and associating said plurality of generated numbers to the client.

3. The method according to claim 2, wherein the association of the at least one code of the plurality of codes with the at least one product of the at least plurality of products comprises entering a product serial number, a manufacturing batch number of a plurality of products, a content of a document, or a universal product code (UPC) of a product.

4. The method according to claim 2, further comprising associating, by the client, the plurality of codes with a single container code, wherein the single container code is stored in the database.

5. The method according to claim 1, wherein in the event of the loss or theft of the at least one product sent by the sender to the recipient, the method further comprises:

notifying, by the sender to the client, the loss or theft of the at least one product; and requesting, by the client, that the system server generates the "blocked" status in the database for the at least one code associated with the at least one product in response to determining that the at least one product was lost or stolen.

6. The method according to claim 1, wherein the step of performing the first alarm action for the client comprises:

sending, by the system server, the first alarm to the client;

requesting, by the system server to the recipient, the data requested from the user to identify the at least one product, in response to the determination that the client's own code for the at least one product is invalid, and sending, by the system server, the first alarm to the client containing the current geolocation data of the at least one product whose code is invalid when the product is identified by the system server, or sending the data requested from the user to identify the at least one product, by the system server, to the client when the user uploads the data requested from the user to identify the at least one product, in response to the determination that the client's own code for the at least one product is invalid.

7. The method according to claim 6, wherein the data requested from the user to identify the at least one product, in response to the determination that the client's own code for the at least one product is invalid comprises at least one of an identification information of the at least one product and a photo of the at least one product.

8. The method according to claim 1, wherein the data requested from the user to identify the at least one product, in response to the determination that the client's own code for the at least one product is invalid comprises at least one of the product identification information and a photo of the product.

9. The method according to claim 1, wherein the step of performing, by the system server, the additional alarm comprises:

identifying the additional alarm;

informing, by the system server to the user, of a possible fraud; and sending, by the system server to the client, identification data of the user and the current geolocation data of the at least one product.

10. The method according to claim 9, wherein the additional alarm is one of: a stolen product alarm, a previously sold or used product alarm, a fake product alarm, a product not available for sale alarm, an unusable product alarm, and a geographic restriction alarm.

11. The method according to claim 1, wherein after the step of sending, by the validation equipment, the identification data of the user, the date, the time and geolocation to the system server, and sending, by the system server, the product identification data and, if available, the product content data, to the user, in the absence of the additional alarm, and wherein the user has received the product content data, the method further comprises:

displaying to the user the product content data;

comparing, by the user, the product content data with the at least one product;

informing, by the user, a discrepancy to the system server when the content data displayed to the user is in disagreement with the at least one product, and preventing, by the system server, changing the product status to "blocked" in the database, and sending, by the system server to the client, date, time and geolocation data of the user; or returning to the step of confirming, by the user to the seller, the purchase of the at least one product associated with the at least one code is validated when the content data displayed to the user is in agreement with the at least one product.

12. The method according to claim 1, wherein the step of performing the additional action comprises:

identifying the additional action;

sending, by the system server to the client and the user, information about the additional action; and initiating, by the client, a process of performing the additional action.

13. The method according to claim 12, wherein the additional action is one of: sending password, sending a guarantee and/or ownership certificate, sending a discount coupon, charging a credit, and performing unblocking services.

14. The method according to claim 1, wherein after the step of updating, by the system server, the current geolocation data of the at least one product in the database when the code is valid, the method further comprises generating the hash of transactions made in the database and inserting the generated hash into the blockchain associated with the client.

15. The method according to claim 1, wherein, the method further comprises generating the hash of transactions made in the database, and inserting the generated hash into the blockchain associated with the client in the absence of the additional action, or after the step of performing the additional action.

16. The method according to claim 1, wherein the sender is the client and the recipient is a distributor.

17. The method according to claim 16, wherein after updating the identification data, the method further comprises sending by the distributor to the seller the at least one product.

18. The method according to claim 1, wherein the sender is the distributor and the recipient is the seller.

19. The method according to claim 1 further comprising:

sending, by the system server to the sender, the plurality of codes;

displaying, by the sender, the plurality codes received on a screen of a first equipment;

reading, by a second equipment associated with the recipient, the plurality of codes displayed;

assigning to each code of the plurality of codes a timestamp indicating the exact time each reading of the plurality of codes was taken;

sending, by the recipient to system server, each read code of the plurality of codes with its respective timestamp; and checking, by the system server, whether an encounter between the first equipment of the sender and the second equipment of the recipient has occurred.

20. The method according to claim 19, wherein the plurality of codes are displayed in the form of QR codes.

21. The method according to claim 19, wherein the first equipment of the sender and the second equipment of the recipient have an internet connection.

* * * * *